Figure 4:
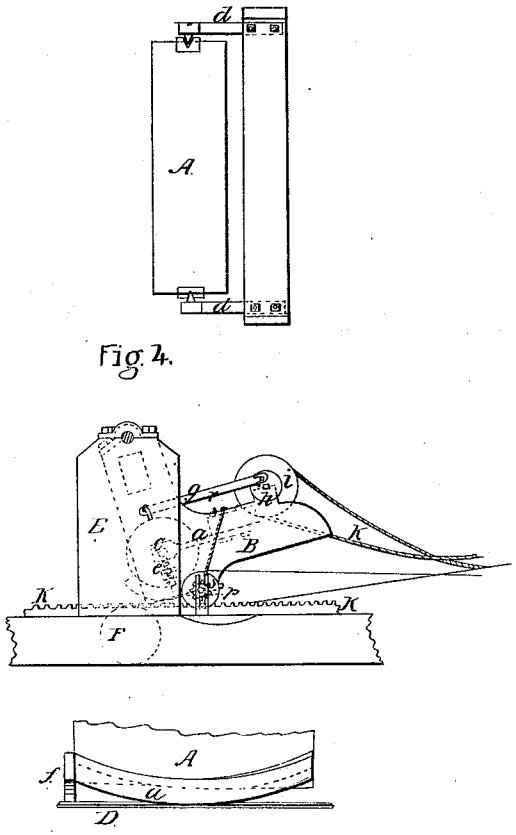
Figure 1:
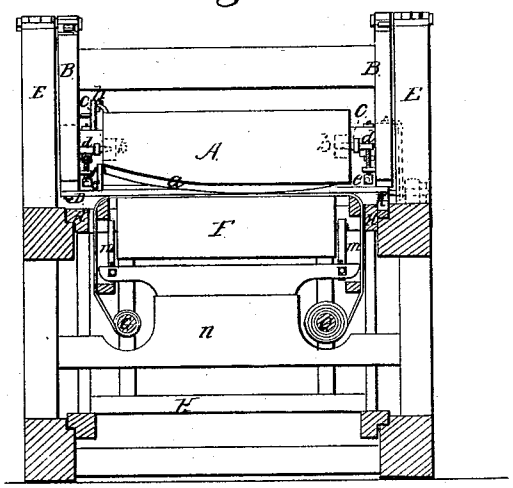

3812X

Sheet 1. 2 Sheets.

B. Swift.

Cloth Shearing Mach.

Patented Feb. 7, 1824.

N. PETERS, PHOTO-LITHOGRAPHER, WASHINGTON, D. C.

3812X
B. Swift.
Sheet 2. 2 Sheets.
Cloth Shearing Mach.
Patented Feb. 7, 1824.
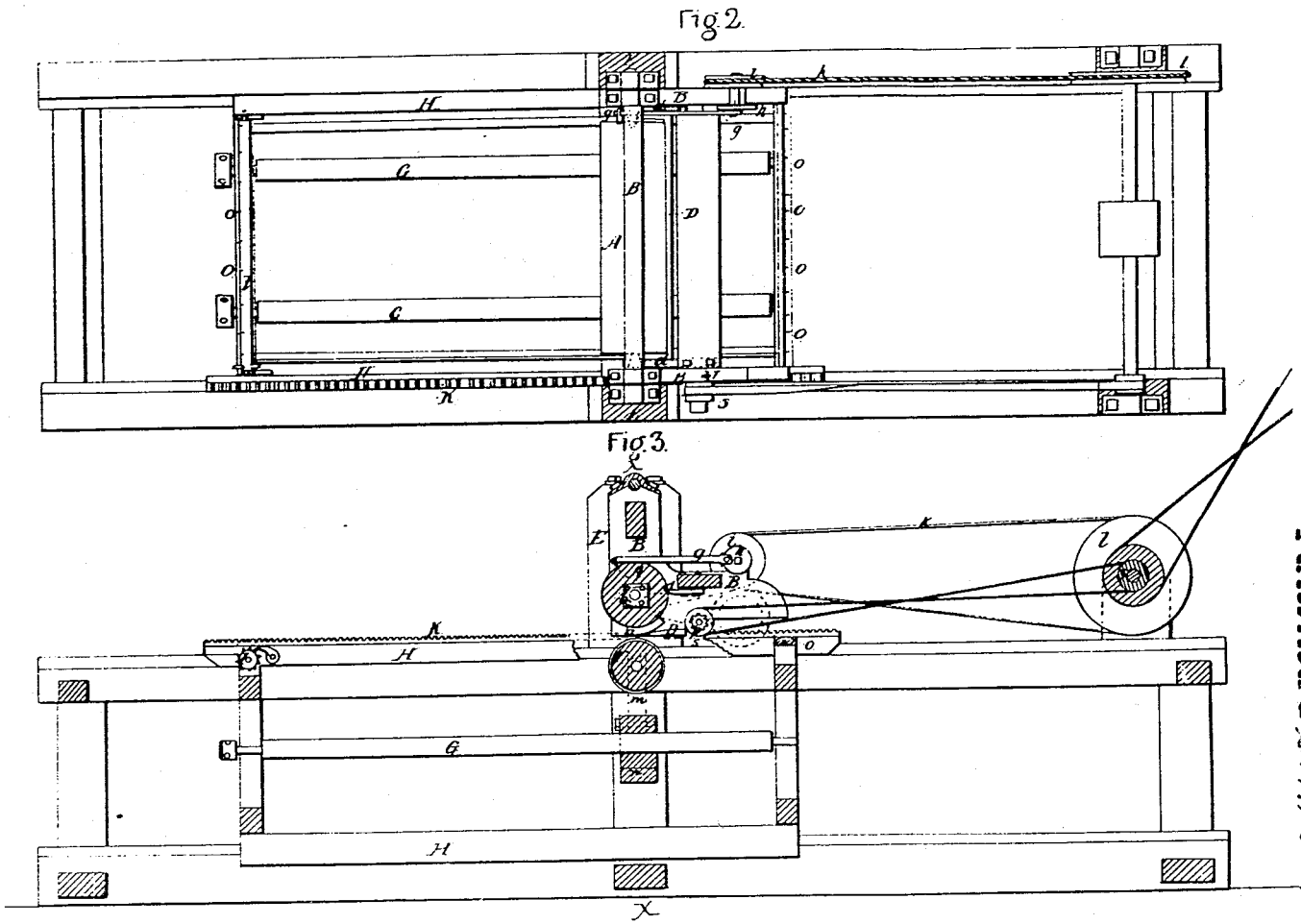
N. PETERS, PHOTO LITHOGRAPHER, WASHINGTON D. C.